United States Patent [19]
Willmann et al.

[11] Patent Number: 5,731,107
[45] Date of Patent: Mar. 24, 1998

[54] POLYACETYLENE-LITHIUM INSERTION COMPOUND, ITS USE IN A STORAGE BATTERY AND PROCESS FOR THE PREPARATION OF INSERTION COMPOUNDS OF THE CONJUGATE POLYMER-LITHIUM TYPE

[75] Inventors: Patrick Willmann, Montgiscard; Denis Billaud; François Xavier Henry, both of Nancy, all of France

[73] Assignee: Centre National d'Etudes Spatiales, Paris Cedex, France

[21] Appl. No.: 325,176

[22] PCT Filed: Oct. 27, 1993

[86] PCT No.: PCT/FR93/01050

§ 371 Date: Jun. 5, 1995

§ 102(e) Date: Jun. 5, 1995

[87] PCT Pub. No.: WO94/10234

PCT Pub. Date: May 11, 1994

[30] Foreign Application Priority Data

Oct. 28, 1992 [FR] France ................... 92 12856

[51] Int. Cl.$^6$ ................... H01M 4/60
[52] U.S. Cl. ................... 429/213; 260/665 R; 264/109; 429/232
[58] Field of Search ................... 429/213, 232; 260/665 R; 264/109, 120

[56] References Cited

U.S. PATENT DOCUMENTS

| | | | |
|---|---|---|---|
| 4,522,901 | 6/1985 | Shacklette | 429/194 |
| 4,624,761 | 11/1986 | Lando . | |
| 4,668,596 | 5/1987 | Shacklette et al. | 429/213 |
| 4,801,512 | 1/1989 | MacDiarmid et al. | 429/213 |
| 4,879,192 | 11/1989 | Nishimura et al. | 429/213 |

OTHER PUBLICATIONS

J.Chem.Soc.Faraday Trans., vol. 80 (1984 month unavailable) pp. 2109–2118, "Electrochemistry of Polyacetylene, (CH).", Richard B. Kaner and Alan G. MacDiarmid.

Takeo Ito et al. "Simultaneous Polymerization and Formation of Polyacetylene Film on the Surface of Concentrated Soluble Ziegler–Type Catalyst Solution". *Journal of Polymer Science*, vol. 12, pp. 11–20. 1974 month unavailable.

K. Akagi et al. "Synthesis of Polyacetylene Films with High Density and High Mechanical Strength". *Synthetic Metals*, vol. 28, pp. D1–D10. 1989 month unavailable.

D. Begin et al. "Effects of the Stretching on the Crystalline Organization of Highly Oriented Trans Polyacetylene-(HOPA)". *Solid State Communications*, vol. 76, No. 5, pp. 591–594. 1990 month unavailable.

Solid State Ionics, vol. 8, 1983 month unavailable, pp. 165–168, M. Fouletier, et al., "Lithium Intercalation in Polyacetylene".

*Primary Examiner*—T. Tung
*Attorney, Agent, or Firm*—Oblon, Spivak, McClelland, Maier & Neustadt, P.C.

[57] ABSTRACT

The invention relates to a polyacetylene-lithium insertion compound, its use in a storage battery and a process for the preparation of polymer-lithium insertion compounds.

This insertion compound contains at least six CH groups per lithium atom and has a monoclinic structure. Polymer-lithium compounds can be obtained by the compression of a polymer mixture, such as polyacetylene, and lithium, e.g. under 30 to 250 MPa and at ambient temperature.

The compound can be used as a negative electrode (5) in a lithium storage battery having an oxide, sulphide or oxysulphide positive electrode (9) and a lithium ion-conducting electrolyte (8).

8 Claims, 4 Drawing Sheets

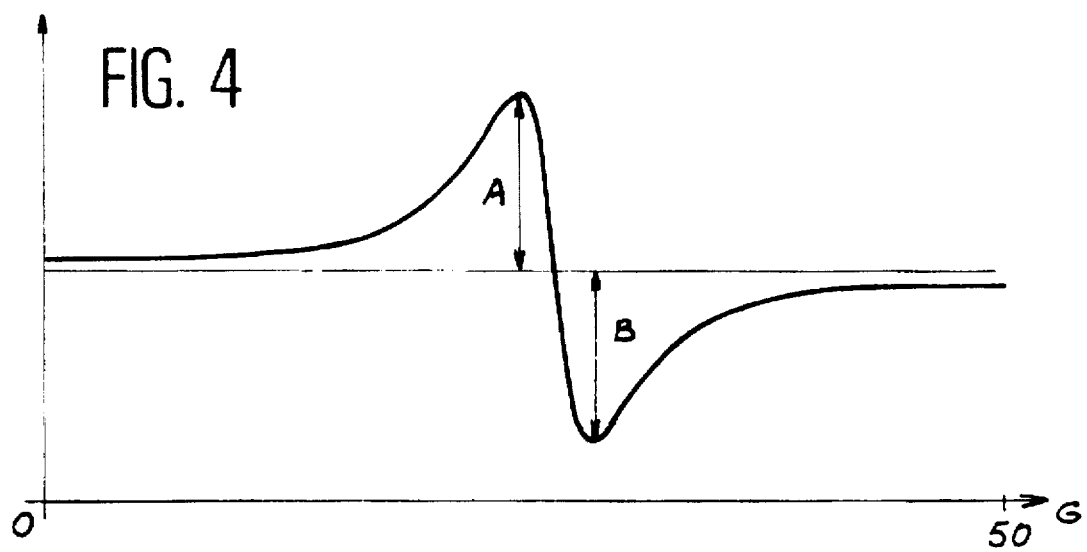
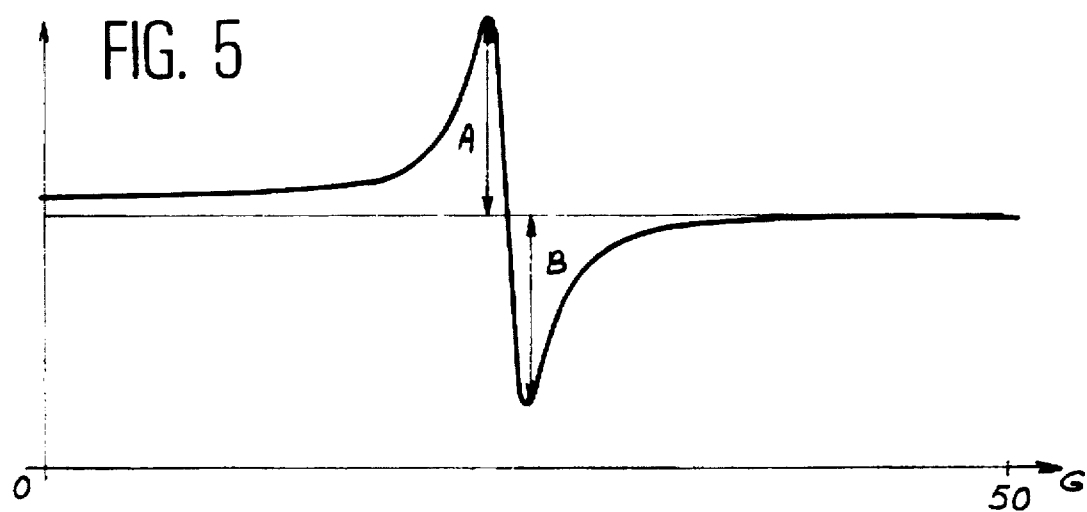
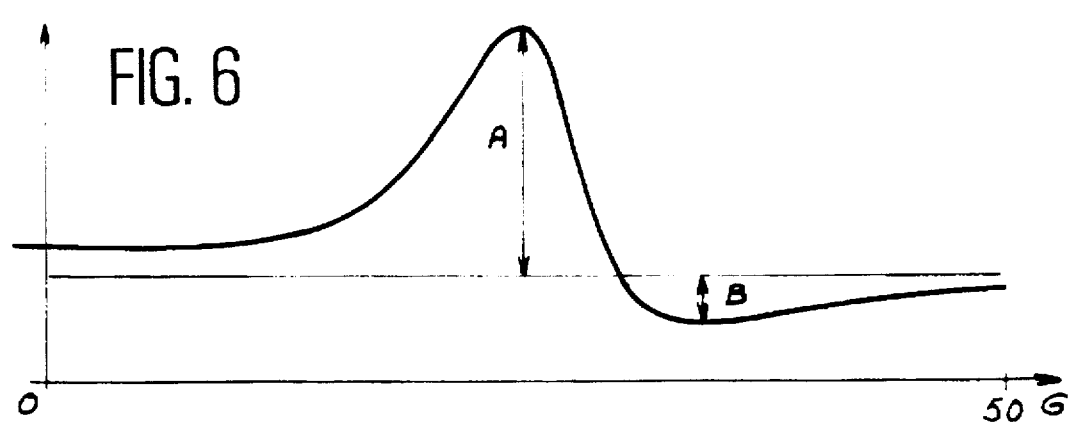

POLYACETYLENE-LITHIUM INSERTION COMPOUND, ITS USE IN A STORAGE BATTERY AND PROCESS FOR THE PREPARATION OF INSERTION COMPOUNDS OF THE CONJUGATE POLYMER-LITHIUM TYPE

The present invention relates to a polyacetylene-lithium insertion compound, more particularly usable as a negative electrode in a storage battery or electric accumulator.

Some years ago lithium electrochemical generators were developed due to their very high potential specific energy. These electrochemical generators comprise a positive electrode, a lithium ion-conducting liquid or solid electrolyte and a lithium-based negative electrode. Generally, the operation of these generators involves lithium intercalation and then deintercalation processes.

For the negative electrode, it is possible to use low potential insertion compounds for the lithium compared with the latter. Among the compounds of this type are known polyacetylene-lithium insertion compounds like those described by Fouletier et al in Solid State Ionics, 8, 1983, pp.165–168, Shacklette et al in J. Electrochem. Soc., vol.132, no.7, 1985, pp.1529–1535 and Jow et al in J. Electrochem. Soc., vol. 135, no.3, 1988, pp.541–548.

The polyacetylene-lithium insertion compounds described in the above documents are prepared electrochemically using an electrolyte in a solid or liquid organic medium.

Chemical processes for the preparation of lithium-doped polyacetylenes are known like those described by Murthy et al in Phys. Rev. B, Rapid Comm., vol.40, no.18, 1989, pp.12550–12553 and Leitner et al in Synth. Met., vol.28, 1989, pp.D225–D229.

The process described by Murthy et al consists of doping a polyacetylene film using an organic solvent containing a lithium compound, e.g. butyl lithium in hexane, phenyl lithium in a cyclohexane-diethyl ether mixture, or biphenyl lithium in 2-methyl tetrahydrofuran. The process described by Leitner et al consists of using a method for the vacuum evaporation of lithium on a polyacetylene film.

These processes are easier to put into effect than electrochemical processes, but do not make it possible to control the stoichiometry of the polyacetylene-lithium insertion compound obtained and in particular do not make it possible to saturate the polyacetylene with lithium in order to obtain at least the $Li(CH)_6$ stoichiometry.

The present invention relates to a process for the preparation of insertion compounds of the conjugate polymer-lithium type and in particular polyacetylene-lithium insertion compounds, which makes it possible to obtain higher lithium stoichiometries of the compounds.

The invention also relates to a polyacetylene-lithium insertion compound constituted solely by polyacetylene and lithium chains, characterized in that it contains at least six CH groups per lithium atom and in that it has a mono-clinic crystal structure.

Therefore this polyacetylene-lithium insertion compound is very interesting, because its high lithium content gives it much better electrical conductivity and electrochemical capacity or capacitance characteristics than those of the known, lithium-doped polyacetylenes.

When this insertion compound contains six CH groups per lithium atom, it has an electrical conductivity of approximately 250 S/cm.

Its crystal structure is also different from that of the known polyacetylene-lithium insertion compounds, which have been identified as being amorphous or belonging to the trigonal or hexagonal system.

Moreover, this insertion compound can be prepared by a simple, rapid and easily performable process requiring no difficult manipulations of often toxic solvents.

The invention also relates to a process for the preparation of a conjugate polymer-lithium insertion compound consisting of mixing a conjugate polymer with lithium and compressing the thus obtained mixtures.

The conjugate polymers usable in this process are polymers which can be doped by lithium such as polyacetylene, polyparaphenylene, poly(paraphenylene vinylene), poly(paraphenylene acetylene) and composite combinations of these polymers in substituted or unsubstituted form with dielectric polymers such as polystyrene, polyethylene and polypropylene.

For the performance of this process, the polymer and in particular polyacetylene can be in the form of a powder, film, fibres, felt, fabric or foam. The lithium is generally in powder form. However, it is also possible to use lithium in other forms, e.g. in the form of wires or filaments.

For this preparation, in the case of polyacetylene, preference is given to lithium and polyacetylene quantities used in such a way that they correspond to at least the $Li(CH)_6$ stoichiometry, in order to obtain a lithium-rich insertion compound.

It is also possible to use substoichiometric lithium quantities with a view to obtaining an intermediate also having interesting properties. It is also possible to use higher lithium quantities.

For performing this process, it is possible to carry out compression by means of conventional devices such as screw or piston presses. For compression purposes, it is possible to use pressures of 30 to $10^4$ MPa. In the case of polyacetylene, in order to obtain the $Li(CH)_6$ stoichiometry or less, pressures of 30 to 250 MPa are generally adequate. Working generally takes place at ambient temperature, but it would also be possible to use higher or lower temperatures e.g. up to 100° C.

Compression can take place in an atmosphere of rare gas such as argon, in vacuo or in a liquid medium inert with respect to the lithium and the polymer.

The duration of the reaction is dependent on the good homogenization of the mixture. Thus, when use is made of polyacetylene powders or fibres aiding a good contact between the polyacetylene and the lithium, shorter durations are possible than in the case where the polyacetylene is in film form. For example, it is possible to carry out compression for between 2 and 30 hours, generally 4 to 24 hours being adequate.

The polyactylene-lithium insertion compound at least corresponding to the $Li(CH)_6$ stoichiometry obtained by the process of the invention is very interesting due to its richness in lithium and its possibility of giving rise to reversible deintercalation—intercalation reactions of the lithium contained therein.

The insertion compound according to the invention can be used with advantage in a lithium storage battery. Such a storage battery normally has a lithium-based negative electrode, a positive electrode and a lithium ion-conducting electrolyte.

According to the invention, said storage battery is characterized by the use of a negative electrode constituted by the polyacetylene-lithium insertion compound according to the invention and corresponding at least to the $Li(CH)_6$ stoichiometry.

In this storage battery, the positive electrode can be made from various materials such as oxides, sulphides or oxysulphides.

As examples of usable oxides reference can be made to vanadium pentaoxide $V_2O_5$, nickel(II) oxide $NiO_2$, cobalt(II) oxide $CoO_2$, mixed oxides of cobalt and nickel, manganese oxides, molybdenum trioxide $MoO_3$, chromium oxides and vanadium bronzes $MxV_2O_5$, with M representing iron, sodium, potassium, lithium, silver, aluminium, chromium, barium, nickel or cobalt.

Examples of usable sulphides are titanium sulphide $TiS_2$, molybdenum sulphide $MoS_2$ and mixed nickel and molybdenum sulphides.

Examples of usable oxysulphides are molybdenum and titanium oxysulphides.

In said storage battery, the electrolyte used is generally constituted by a lithium salt solution in an appropriate organic solvent.

Organic solvents which can be used are e.g. propylene carbonate, ethylene carbonate, tetrahydrofuran, 2-methyl tetrahydrofuran, dimethoxymethane, dimethoxyethane, N,N-dimethyl formamide, sulpholane and mixtures thereof.

Usable lithium salts are e.g. lithium perchlorate $LiClO_4$, lithium hexafluorophosphate $LiPF_6$, lithium hexafluoroarsenate $LiAsF_6$, lithium trifluoromethane sulphonate $LiCF_3SO_3$ and lithium tetrafluoroborate $LiBF_4$.

Use can also be made in the invention of solid electrolytes or lithium ion-conducting polymers.

As an example of solid electrolytes reference can be made to lithium glasses e.g. obtained from $P_2S_5$, $Li_2S$ and LiI or $B_2S_3$, $Li_2S$ and LiI.

Lithium ion-conducting polymers can, for example, be constituted by poly(ethylene oxide) or poly(propylene oxide) containing a lithium salt such as the salts referred to hereinbefore.

In a battery of this type using a liquid electrolyte, a separator is generally placed between the electrodes and it can be constituted by a microporous film e.g. made from polypropylene or polyethylene.

This battery can be produced in the form of a cylindrical battery having a spiral winding of two electrodes optionally separated by the separator. It can also be produced in the form of a prismatic battery with facing planar electrodes and optionally a separator between said electrodes.

The lithium insertion compounds obtained by the process of the invention can also be used in catalysis, e.g. for polymerization reactions.

Other features and advantages of the invention can be gathered from the following non-limitative description with reference to the attached drawings.

BRIEF DESCRIPTION OF THE DRAWINGS

FIGS. 4 to 6 Electron paramagnetic resonance (EPR) spectra obtained with pure polyacetylene, a polyacetylene-lithium insertion compound $Li(CH)_{11}$ and the polyacetylene-lithium insertion compound $Li(CH)_6$ according to the invention.

The following examples illustrate the preparation of polyacetylene-lithium insertion compounds using the process of the invention.

EXAMPLE 1

Preparation of the compound $Li(CH)_6$

In this example, mixing takes place of 100 mg of polyacetylene in cotton wool form, i.e. fibres, with 9 mg of lithium in powder form, in a glove box and under an argon atmosphere. The mixture is then poured into a screw press having a diameter 13 mm piston and is compressed under a pressure of 100 MPa for 4h, still under an argon atmosphere. The sample is then removed from the mould and has a uniform, golden yellow colour.

This is followed by the characterization of the compound obtained in this example corresponding to the $Li(CH)_6$ stoichiometry by X-ray diffraction and electron paramagnetic resonance (EPR).

EXAMPLE 2

Preparation of the compound $Li(CH)_{11}$

This example follows the same operating procedure as in example 1 for preparing a polyacetylene-lithium insertion compound, but use is only made to 5 mg of lithium, which corresponds to $Li(CH)_{11}$ stoichiometry.

The insertion compound obtained is characterized by X-ray diffraction and EPR.

The following results are obtained in examples 1 and 2.

X-ray diffraction

Figure 1:
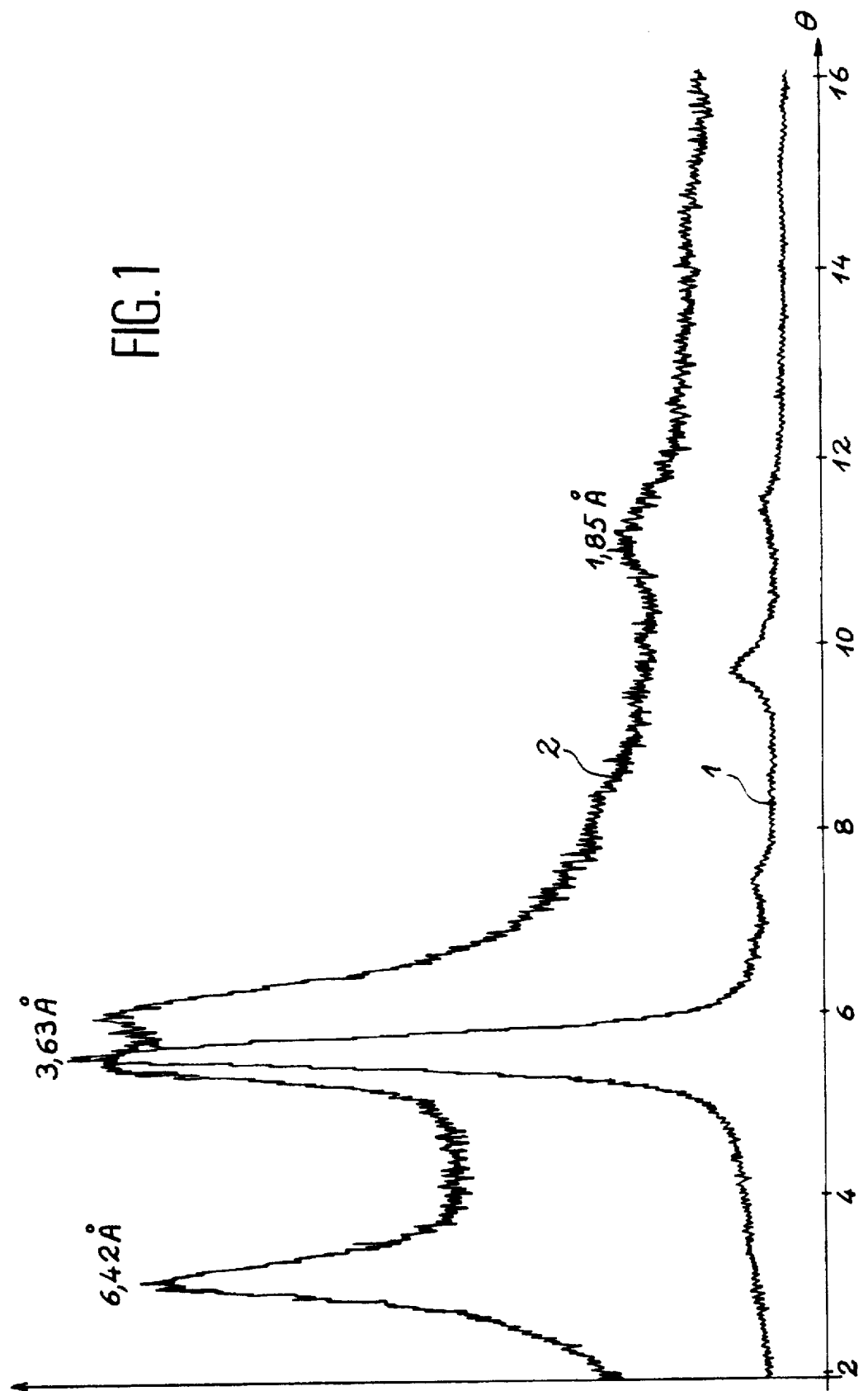
FIGS. 1 and 2 X-ray diffraction patterns showing the hk0 reflections of polyacetylene-lithium insertion compounds obtained by the process of the invention.
Figure 2:
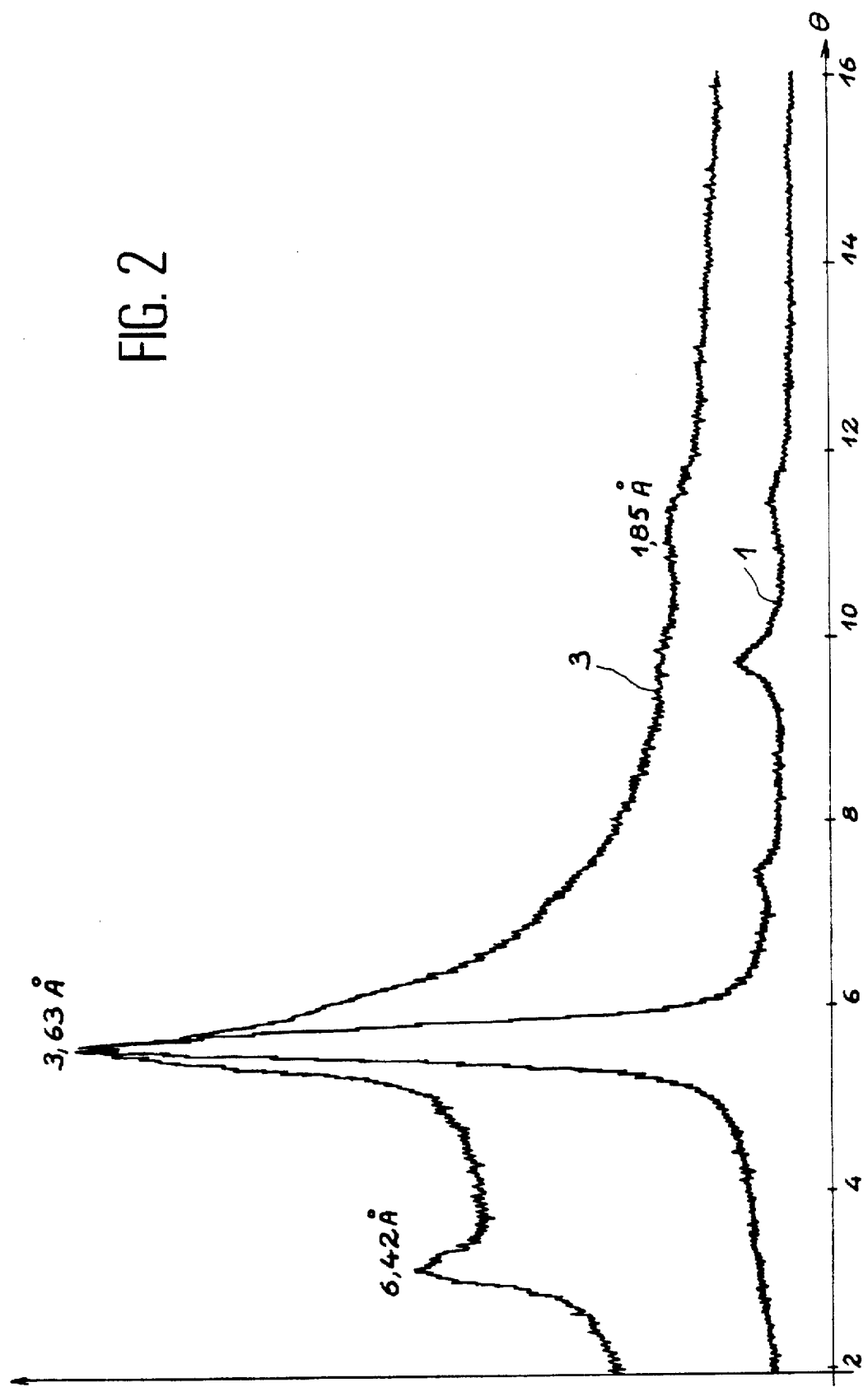

FIGS. 1 and 2 are X-ray diffraction patterns obtained with a molybdenum anticathode (K α radiation) for hk0 reflections of the pure polyacetylene (curve 1), the polyacetylene-lithium $Li(CH)_6$ insertion compound of example 1 (curve 2) and polyacetylene-lithium $Li(CH)_{11}$ insertion compound of example 2 (curve 3).

Figure 3:
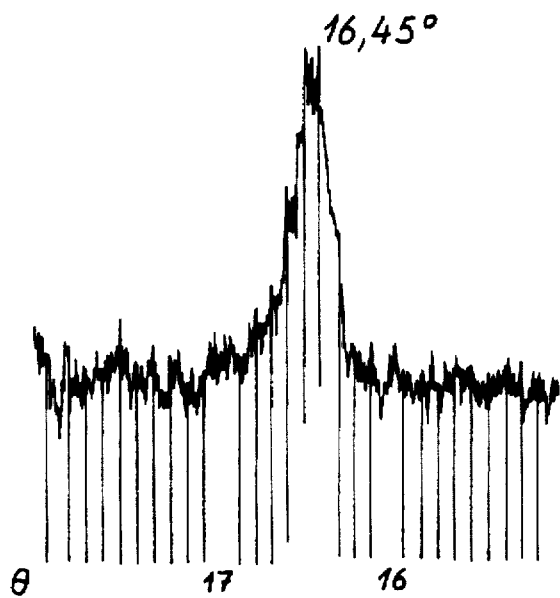
FIG. 3 A X-ray diffraction pattern illustrating the first reflection 001 of a polyacetylene-lithium insertion compound $Li(CH)_6$ according to the invention.

FIG. 3 shows the X-ray diffraction pattern for the first reflection 001 of the polyacetylene-lithium insertion compound $Li(CH)_6$ of example 1.

The drawings show that the intensities of the hk0 reflections vary between the $Li(CH)_6$ and $Li(CH)_{11}$ insertion compounds, but are at the same positions. Thus, the intensity increases with the insertion rate.

The X-ray investigations related to the analysis of the hk0 reflections (organization in the plane (ab), i.e. in the plane perpendicular to the polymer chains), the analysis of the first reflection 001 (organization according to the axis c parallel to the polymer chains) and the analysis of the reflections hk1 (revealing of the three-dimensional organization).

The following Table 1 gives the reticular distances corresponding to the reflections hk0 observed on the basis of the results of FIG. 1, giving for reference purposes the results obtained by Murthy et al in Phys. Rev. B, Rapid Comm., vol.40, no.18, 1989, pp.12550–12553.

TABLE 1

| Ex. 1 | | MURTHY et al | |
|---|---|---|---|
| d (Å) | $I_{exp}$ | d (Å) | $I_{exp}$ |
| 6.42 | 60 | 6.30 | 10 |
| 3.63 | 80 | 3.67 | 100 |
| 3.26 | 100 | 3.18 | 5 |
| 1.85 | 10 | | |

On the basis of the results given in the Table, it would appear that for insertion compounds prepared in a medium having an organic solvent, the intensity maximum observed at 3.67 Å corresponds to intense reflections of the undoped trans-polyacetylene (110 and 020 of the trans($CH)_x$).

However, for the insertion compound of the invention obtained by compression, the reflection intensities hk0 at 6.42 and 3.63Å are equivalent and the maximum is at 3.26Å.

There is no longer any fresh polyacetylene $(CH)_x$ and the first reflection 001, indexed here as 002 is displaced to 16° 45 compared with the value 16° 82 corresponding to the undoped polyacetylene.

The values of the intensities of the X reflections of the insertion compounds of the invention do not correspond with those obtainable from the hexagonal lattice proposed by Murthy.

The coherence length observed on the reflection at 6.42Å is close to 50Å: said reflection being double (100+010).

The X-ray diffraction data indicate that the structure of the $Li(CH)_6$ saturated insertion compound of the invention corresponds to a monoclinic structure (deformed hexagonal lattice) with the following characteristics: a=7.30Å, b=7.5Å and a β angle (â,b̂) close to 120° C.

Therefore the indexing of the experimental lines is as follows:

| d (Å) | hk0 |
| --- | --- |
| 6.42 | 100, 010 |
| 3.63 | 110 |
| 3.26 | 200, 020 |
| 1.85 | 310, 130, 220 |

In this structure a lithium column is surrounded by three polyacetylene chains. Thus, the formula of the compound is $Li(C_nH_n)_3$ and the examination of the distance 002 corresponds to a charge transfer of 16.6% giving the formula $Li(C_2H_2)_3$, which corresponds to the position of a lithium ion every two units (CH) in the direction parallel to the polymer chains.

This structure has been confirmed by a fibre diagram also showing the three-dimensional organization of the compound $Li(CH)_6$.

Electron paramagnetic resonance

The spectra obtained are shown in FIG. 4 in the case of pure polyacetylene, FIG. 5 in the case of the insertion compound $Li(CH)_{11}$ of example 2 and FIG. 6 in the case of the insertion compound $Li(CH)_6$ of example 1.

The EPR signals in these drawings are characterized by their line width $\Delta H_{pp}$ and by their asymmetry ratio A/B, these values being given in the following Table 2.

TABLE 2

|  | Gain | Scan | $\Delta H_{pp}$ | A/B |
| --- | --- | --- | --- | --- |
| Pure polyacetylene (FIG. 4) | $5 \cdot 10^3$ | 50G | 4.7G | 1 |
| $Li(CH)_{11}$ (FIG. 5) | $1.25 \cdot 10^3$ | 50G | 2.9G | 1.08 |
| $Li(CH)_6$ (FIG. 6) | $5 \cdot 10^3$ | 50G | 9.5G | 4.25 |

In all the cases the films have a thickness of 75 μm.

The spectrum of FIG. 4 is characteristic of a polyacetylene film containing a mixture of cis and trans isomers. The signal is due to single electrons linked with neutral solitons of the trans faction of polyacetylene. The line width $\Delta H_{pp}$ is 4.7G and is linked with the cis/trans ratio. Thus, for comparison, the line width $\Delta H_{pp}$ of a completely trans material is below 2 gauss. The A/B=1 ratio indicates that the material is not conductive.

The spectrum of FIG. 1 corresponding to the polyacetylene-lithium $Li(CH)_{11}$ insertion compound shows that the intensity and line width have decreased compared with pure polyacetylene, whereas the asymmetry ratio A/B has increased slightly to 1.08. This spectrum is characteristic of a weakly doped material (decrease of intensity linked with the disappearance of neutral solitons paired by the electrons s of the intercalated lithium atoms), a majority trans material (doping inducing the cis→trans transformation) and finally a material becoming conductive because the A/B ratio exceeds 1.

The spectrum of FIG. 6 corresponding to the polyacetylene-lithium insertion compound $Li(CH)_6$ shows that the line width $\Delta H_{pp}$ has significantly increased (9.5G) and this also applies with respect to the A/B ratio, which is 4.25. The A/B ratio increase is characteristic of a highly conductive material.

On the basis of the EPR spectra, it is possible to determine the electrical conductivity of the compound using the theoretical Kodera curve linking the ratio d/δ of the material with A/B, d and δ respectively representing the geometrical thickness of the sample and the skin depth.

The electrical conductivity σ corresponds to the followng formula:

$$\sigma = (\pi \delta^2 \mu_0 \gamma)^{-1}$$

in which $\mu_0$ represents the permittivity of vacuum, γ represents the frequency of the electromagnetic excitation and δ represents the skin depth.

For the insertion compound of example 1, whose EPR spectrum is illustrated in FIG. 6, for σ there are two values respectively 250 and 450 S/cm, because the same A/B ratio is linked with two possibilities.

This ambiguity can be removed by a study of the evolution of the signal with the temperature T. By increasing T, there is an increase in σ, which leads to a displacement on the Kodera curve. Prior to the maximum, A/B increases at the same time as the temperature, whereas after the maximum A/B decreases when the temperature increases. Studies as a function of the temperature have consequently made it possible to remove these ambiguities and it is found that the value of σ is 250 S/cm.

A measurement of the electrical conductivity of the compound by the direct method with four contacts confirms this value.

Thus, lithium insertion induces an important increase in the electrical conductivity of the material, which passes from $10^{-9}$ S/cm for pure polyacetylene to a few hundred S/cm for the insertion compound.

Figure 7:
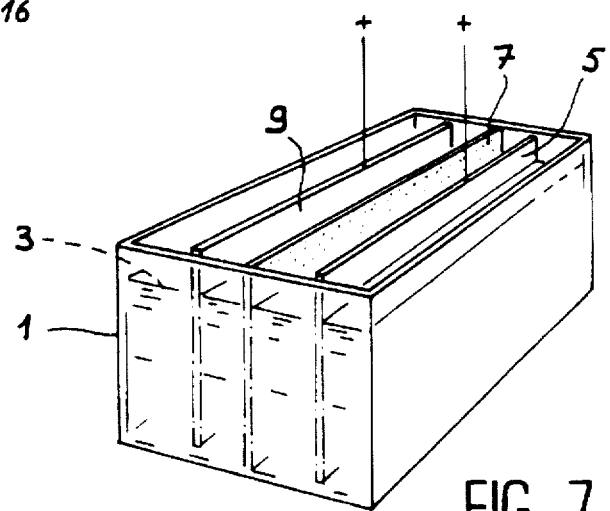
FIG. 7 A diagrammatic representation of a storage battery according to the invention.

FIG. 7 shows a lithium storage battery using the polyacetylene-lithium insertion compound of the invention. It can be seen that the battery has a polytetrafluoroethylene container 1 filled with an electrolyte 3, e.g. constituted by ethylene carbonate containing 1 mole/l of lithium perchlorate, in which are successively placed a negative electrode 5 constituted by the polyacetylene-lithium insertion compound $Li(CH)_6$ of the invention, a separator 7 constituted by a microporous polypropylene membrane and a vanadium oxide positive electrode 9.

Figure 8:
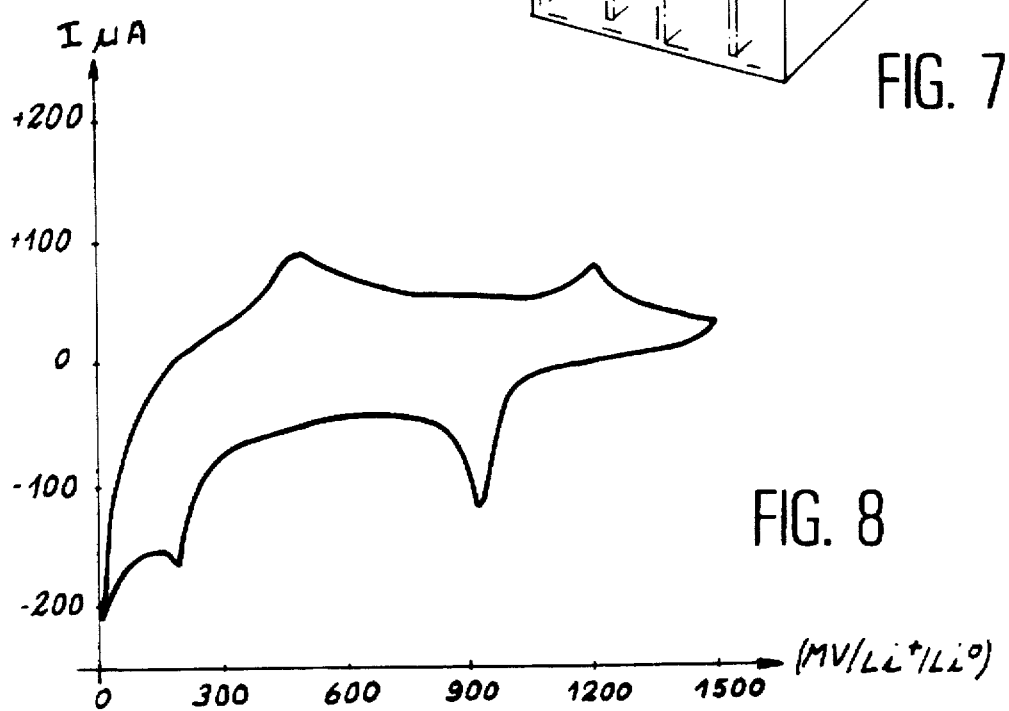
FIG. 8 A cyclic voltammetry curve of the insertion compound $Li(CH)_6$ of the invention.

FIG. 8 shows the cyclic voltammetry curve obtained with a negative electrode constituted by the polyacetylene-lithium insertion compound $Li(CH)_6$ of the invention obtained from fibrous polyacetylene and operating under the following conditions:

| scanning rate: | 1.5 mV/min, |
| --- | --- |
| temperature: | 50° C. ± 2, |
| reference electrode: | $Li^+/Li^0$, |
| electrolyte: | ethylene carbonate containing 1.075 mole of $LiClO_4$ per kg of |

| | ethylene carbonate, |
| mass of the electrode: | 6.5 mg of fibrous polyacetylene. |

In the drawing representing the evolution of the current intensity (I) in µA as a function of the potential $V_s$ applied to the electrode (in mV), it is possible to see several reduction and oxidation peaks of the electrode.

We claim:

1. A polyacetylene-lithium insertion compound consisting of polyacetylene chains and lithium, wherein said insertion compound contains 6 CH groups per lithium atom and has a monoclinic structure.

2. The compound according to claim 1, having an electrical conductivity of approximately 250 S/cm.

3. A storage battery comprising a lithium-based negative electrode, a positive electrode and a lithium ion-conducting electrolyte, wherein said negative electrode is constituted by the polyacetylene-lithium insertion compound according to claim 1.

4. A process for the preparation of a polyacetylene-lithium insertion compound, consisting of the steps of:

mixing a polyacetylene having a monoclinic structure with lithium, and compressing the thus obtained mixture.

5. A process according to claim 4, wherein said polyacetylene is in the form of powder, film, fibers, felt, fabric or foam.

6. A process according to claim 4, wherein said compressing takes place under a pressure of 30 to $10^4$ MPa.

7. A process according to claim 4, wherein said compressing takes place under a pressure of 30 to 250 MPa for 2 to 24 h.

8. A process according to claim 4, wherein said polyacetylene and lithium quantities are such that they correspond to a $Li(CH)_6$ stoichiometry.

* * * * *